March 3, 1964 J. G. RABBY ETAL 3,123,254
LIQUID DISPENSING CONTAINER
Filed May 20, 1959 5 Sheets-Sheet 1

INVENTORS
JOSEPH G. RABBY
JAMES C. WILSON
BY
ATTORNEYS

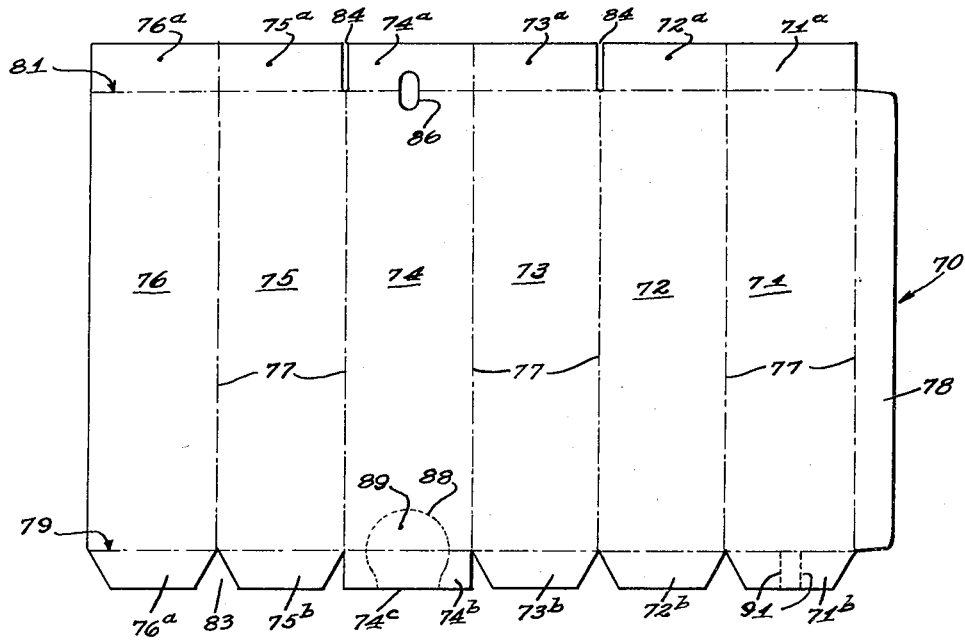
Fig. 7.
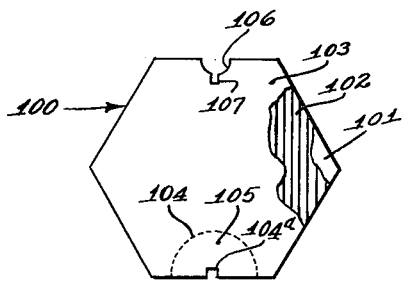
Fig. 9.
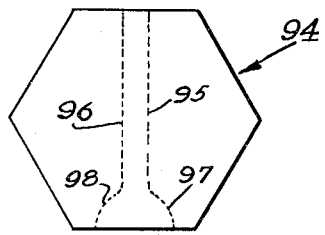
Fig. 8.
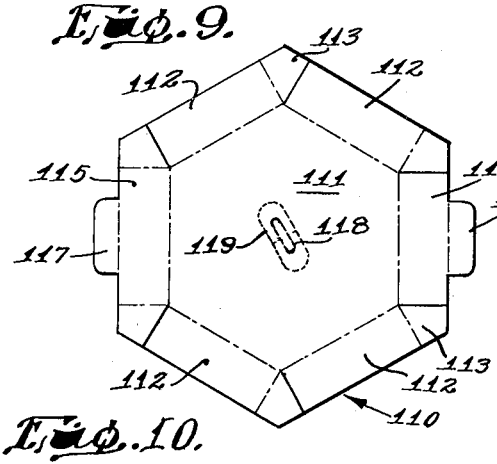
Fig. 10.
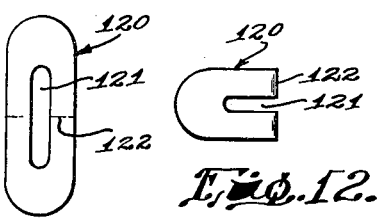
Fig. 11.
Fig. 12.
INVENTORS
JOSEPH G. RABBY
JAMES C. WILSON
BY
W. A. SCHAICH
ATTORNEYS

INVENTORS
JOSEPH G. RABBY
JAMES C. WILSON
BY
W. A. SCHAICH
ATTORNEYS

March 3, 1964   J. G. RABBY ETAL   3,123,254
LIQUID DISPENSING CONTAINER
Filed May 20, 1959   5 Sheets-Sheet 5
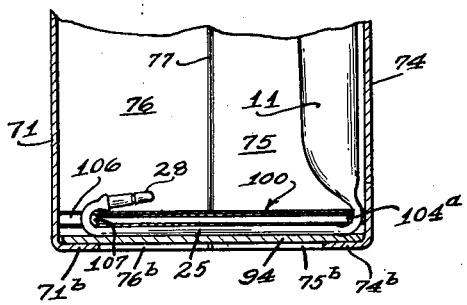
FIG. 17.
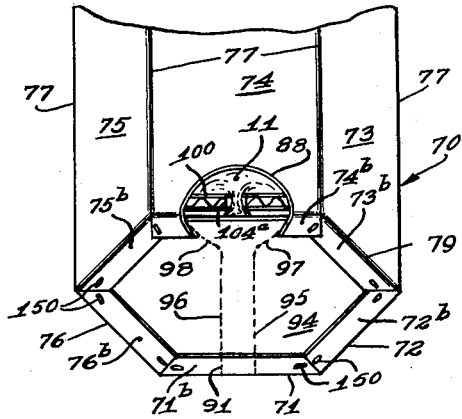
FIG. 18.
FIG. 19.
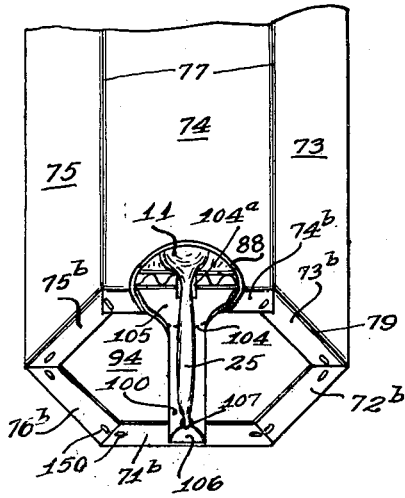
FIG. 20.
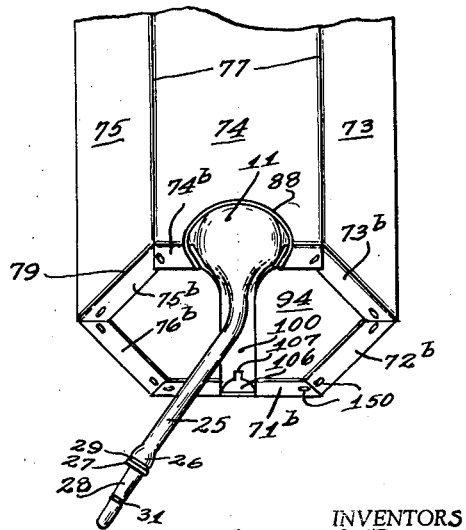
INVENTORS
JOSEPH G. RABBY
JAMES C. WILSON
BY
W. A. SCHAICH
ATTORNEYS 3,123,254
LIQUID DISPENSING CONTAINER
Joseph Glenn Rabby and James C. Wilson, Jacksonville, Fla., assignors to Owens-Illinois Glass Company, a corporation of Ohio
Filed May 20, 1959, Ser. No. 814,570
11 Claims. (Cl. 222—105)

The present invention relates to an improved receptacle for fluent material and, more particularly to a receptacle which is adaptable for carrying, storing, and dispensing liquids.

The receptacle or container of the present invention finds particular application as a container and dispenser of milk, and the disclosure and description appearing hereinafter will have particular reference to this application, although it will be apparent that the container will have wider application and utility.

For the most part, milk is packaged in individual, small-volume glass containers. It is obvious that this type of packaging is more expensive than can be achieved by bulk packaging in larger quantities. Accordingly, in recent years, a demand has grown up for milk packaged in bulk quantities of about five gallons. It is obvious, of course, that packaging in this form will necessarily involve certain problems with respect to the maintenance of high standards of cleanliness and sterility.

One scheme which has been utilized for packing milk in bulk fashion has been to utilize a stainless steel drum of the type generally disclosed in U.S. Patents 2,601,319, 2,681,747, 2,377,261, and 2,683,556. The stainless steel drums incorporate a dispensing hose at the bottom. At the retail level, the drums are stored in refrigerating cabinets which include at the bottom a pinch-cock valve through which the hose is fed, and thus permitting "on" and "off" control. A refrigerating cabinet of this type is disclosed in the latter three of the above-mentioned patents. The utilization of the stainless steel drums for the purposes enumerated possesses certain disadvantages, however. One of these is that the stainless steel drum must be reused due to the inherent expense of the drum itself. In addition, the drums must be washed and sterilized between uses. Further, the stainless steel drums must be retinned regularly. Finally, the high initial cost makes the occasional loss of such drums an economical burden.

More recently, it has been proposed to provide a container of this type which is composed of a corrugated or fiberboard container and an interiorly located, flexible bag, fabricated of polyethylene, and being equipped with a dispensing nozzle at the bottom of the bag. Unfortunately, it has been found that the polyethylene contains pin holes, whereby the bag leaks milk, whereby loss is incurred. Furthermore, difficulty has been experienced in the dispensing of milk from such containers due to the fact that loss occurs due to incomplete drainage of the contents. In particular, it has been found that this is due to the fact that the bag collapses and becomes disarranged, leading to pinching-off of the exit and trapping of liquid within.

Accordingly, it is a principal object of the present invention to provide an improved expendable receptacle for storing and dispensing liquids.

It is another object of the present invention to provide such a receptacle which is non-leaking, and which is, by reason of its novel character, completely self-emptying.

It is still another object of this invention to provide such a receptacle which includes as a principal component, an elastic, inflatable, or extensible bag, contained safely in a receptacle fabricated of foldable paperboard of the like.

The foregoing and other objects of the present invention will become apparent to those skilled in the art from the following detailed description, taken in conjunction with the annexed sheets of drawings, on which there are presented for purposes of illustration only, several embodiments of the invention.

In the drawings:

FIG. 7 is a plan view of a blank which is used to form a receptacle in yet another embodiment of the receptacle of this invention.

FIG. 8 is a plan view of another bottom-forming panel for use in the receptacle according to FIG. 1.

FIG. 9 is a plan view of a panel forming a bottom for the carton shown in blank in FIG. 7.

FIG. 10 is a plan view of a blank sheet, slitted and scored to define a top cap for the receptacle in accordance with the embodiment in FIG. 7.

FIG. 11 is an enlargement of a scored area in the central panel of FIG. 10.

FIG. 12 is another view of the element of FIG. 11, but folded over to form a double thickness.

FIG. 17 is an enlargement of FIG. 14.

FIGS. 18–20 are perspective views of the bottom portion of the container at progressive stages of the opening thereof, preparatory to installation in a refrigerating and dispensing cabinet.

Basically, the present invention contemplates a container, carrier, and dispenser for liquids which includes an extensible or inflatable, rubber-like bag, having filling and dispensing openings, and an expendable supporting and protecting container, having corresponding openings.

The present invention, in addition contemplates a novel receptacle which locates the filling and dispensing openings in desirable and operative fashion, so as to be readily utilizable with existing refrigerated dispensing equipment.

Figure 1:
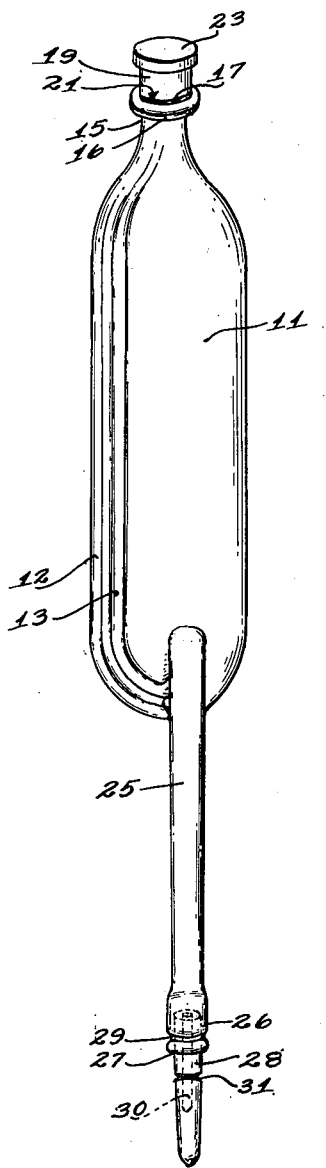
FIG. 1 is a perspective view of the inflatable bag component in its relaxed or contracted position.

Referring now more specifically to the drawings, there is shown in FIG. 1 an inflatable or extendable, rubber-like bag 11. The bag is preferably formed of odor-free and taste-free, virgin latex material, so that no undesirable flavor or odor will be imparted to the liquid contents. The bag includes, along its side, bellow-like folds 12 and 13, which further aid in the extensibility of the bag. The top of the bag is provided with a neck-down portion 15, terminating in a lip 16, defining a filling opening 17. Into the opening 17 is fitted a rigid, cylindrical fitment 19, conveniently formed of a plastic material, e.g., styrene, methacrylate, or the like. A groove 21 therein receives the lip 16, and thus holds the fitment and the bag securely together. The other end of the fitment is provided with a suitable cap 23, which may be a snap-cap or a screw cap, as desired. The bottom end of the bag at one side is provided with an integral extension 25, which terminates in a lip 26, defining a dispensing opening 27. The dispensing extension 25 is fitted with a plastic fitment 28 of similar material to the fitment 19, provided with an annular groove 29, into which the lip 26 recesses to lock the two together. The fitment is axially bored as at 30, but not through the entire length. In this fashion, the fitment serves as a plug closing the extension 25. The fitment is provided with a second groove 31 forming an annular line of weakness which, when snapped, exposes the internal bore and permits the contents to be emptied.

FIGS. 2–6 illustrate the combination of the inflatable bag 11 with an outer receptacle or shell which may be fabricated of a relatively stiff, sheet-like material. Because of its light weight and low cost, paperboard is desirably used. The paperboard may be in the form of the well known corrugated board formed of two sheets of kraft liner board, having therebetween a sheet of corrugated or fluted medium, or solid fiberboard formed by laminating together several thicknesses of kraft liner board. The composite board is desirably coated with a wax or a resin to make it more resistant to moisture.

Figure 4:
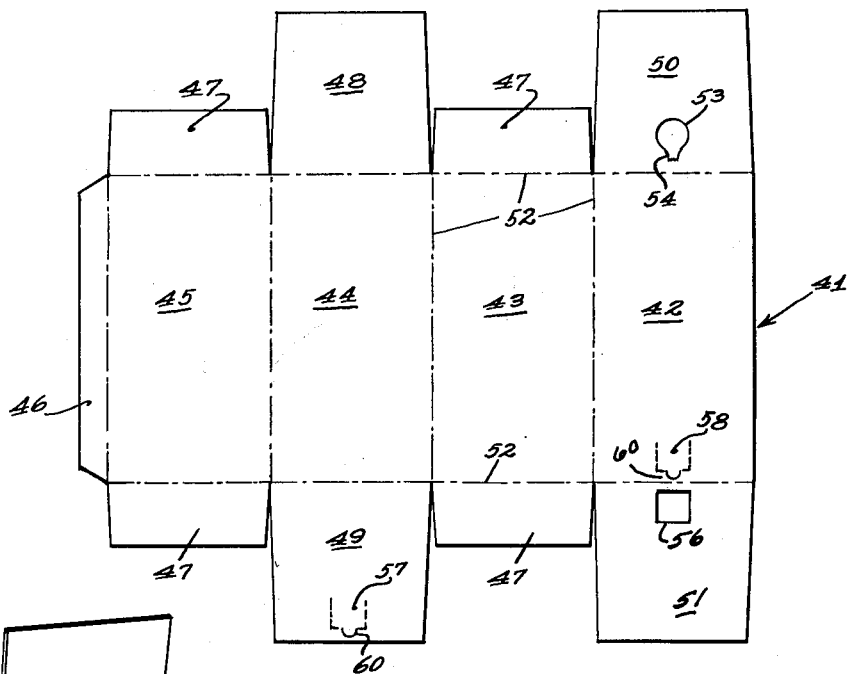
FIG. 4 is a plan view of the blank which forms the principal element of the receptacle shown in FIG. 2.
Figure 5:
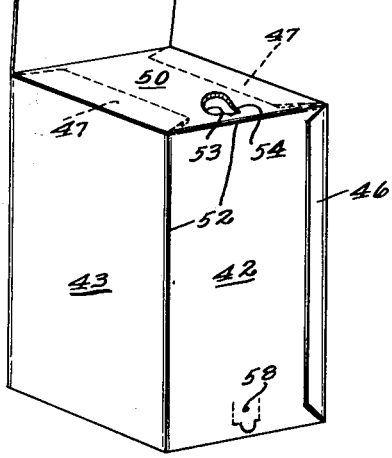
FIG. 5 is a perspective view of the carton or receptacle formed from the blank shown in FIG. 4.
Figure 6:
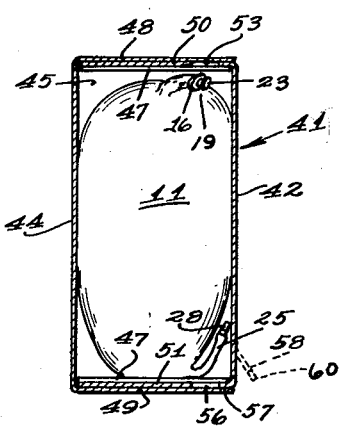
FIG. 6 is a sectional view of a receptacle constituting another embodiment of the invention.

A principal component of a carton for forming a container for the inflatable bag is shown in FIG. 4, identified by reference numeral 41. It is composed of four foldably connected panels 42, 43, 44, and 45. Panel 45 is provided with a laterally extending glue flap 46. Panels 43 and 45 are each provided with minor flaps extending from each end and identified by the numerals 47. Panel 44 is provided with major flaps 48 and 49 at opposite ends. Panel 42 is similarly provided with major flaps 50 and 51 at each end. All of the aforementioned flaps are separated from the panel members by fold lines 52. Flap 50 is provided with a key-way shaped cut-out 53 adjacent to its connection to the panel 42. The cut-out has a narrow or restricted portion 54. Flap 51 is provided with a generally square cut-out 56. Flap 49 and panel 42 are provided with similar score-defined pull-away doors 57 and 58, respectively, both including severed ear portions 60. The blank, as described, is assembled in conventional fashion by folding on the score lines 52 to form the panels 42–45 into tubular formation with the glue flap 46 connecting with panel 42 (FIG. 5). The flaps 47 are then folded in, followed by in-folding of the top flaps 50, 48, and bottom flaps 51, 49, in that order. When folded in this fashion, and as shown in FIGS. 5 and 6, the cut-out 56 in flap 51 will be in registry with the pull-away door 57 in flap 49 so that the interior of the carton may be exposed by pulling away the flap 57 by means of the ear 60. Alternatively, access can be had to the side of the carton by pulling up on ear 60 or pull-away flap 58. In FIG. 6, there is specifically shown the bag 11 contained in the carton 41, and with its lower dispensing extension 25 conveniently accessible by means of the pull-out flap 58 in the side of the carton, or the pull-out door 57 in the bottom of the carton.

The cut-out notch 53 in the top flap 50 of the carton is conveniently used to locate and support the filling fitment 19 as the inflatable bag is filled with the fluid contents. It will be appreciated that the bag should be desirably inserted into the supporting receptacle prior to filling. Otherwise, difficulty would be encountered in attempting to position the filled bag within the carton. The cut-out 53 is also conveniently utilized at the retail outlet to hold the filling fitment 19 in the top of the carton to thus insure complete drainage of the liquid contents. Such also permits the uppermost portion of the inflatable bag from becoming dislodged as the contents are drained, and thus avoids possible pinching of the bag, which would possibly lead to premature cut-off of the liquid supply.

Figure 2:
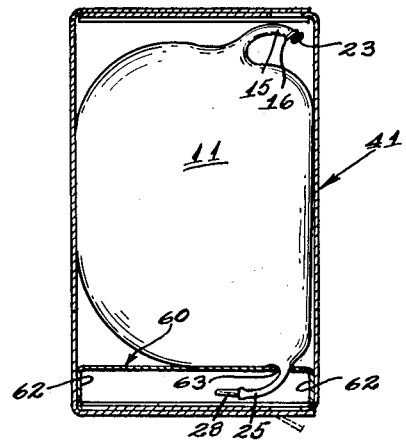
FIG. 2 is a cross-sectional elevation view of the bag in its extended or inflated position, and contained in a receptacle.
Figure 3:
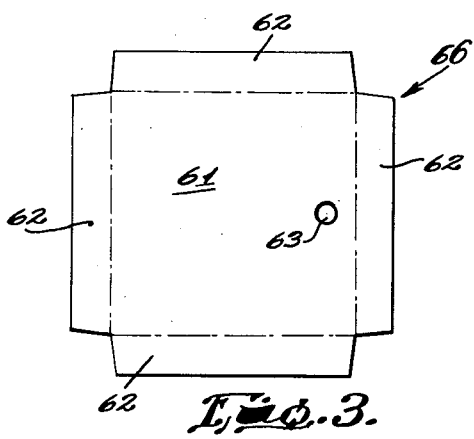
FIG. 3 is a plan view of an element of the receptacle shown in FIG. 2.

In another embodiment of this invention, as shown in FIGS. 2 and 3, there is utilized within the tubular carton 41, a support platform 66 which is shown in blank form in FIG. 3. It is composed simply of a rectangular panel 61, generally equal in configuration to the horizontal sectional configuration of the tubular carton, and having marginal flaps 62 foldably connected thereto which are foldable into marginal support legs for elevating the panel 61 above the bottom formed by the bottom closure flaps. The panel 61 is provided with a circular aperture 63, through which may be projected the extension portion 25 of the bag. In this embodiment, utilization of the bottom wall pull-out flap is desirable.

Another and preferred embodiment of a carton receptacle for forming the dispensing container of the present invention is illustrated in FIGS. 7–14 and 17 to 20. The principal container component 70 is shown in blank form in FIG. 7. It is composed of six foldably connected panel members 71, 72, 73, 74, 75, and 76, separated by fold lines 77. Panel 71 has foldably attached thereto, a lateral glue flap 78, which is used in the conventional fashion to connect panel 71 to panel 76 by means of glue, staples, or the like to provide, in the case of the blank shown, a tubular carton of hexagonal configuration, when viewed in top plan. Parallel score or fold lines 79 and 81 define, respectively, the lower and upper edge of the container body. Each of the panels 71–76 is provided with upper flaps extending beyond the fold line 81, which are identified by the same reference numeral as the panel, but bearing the legend notation $a$. In similar fashion, each of the panels is provided with a lower flap extension which is identified by the same numeral, but including the legend notation $b$. The lower flap extensions 71$b$–76$b$ are independently foldable and are separated one from the other by a V-shaped notch as at 83. Upper flaps 75$a$ and 76$a$ are connected, but are separated by an extension of the score line 77 beyond the score line 81. Flaps 73$a$ and 74$a$, and flaps 71$a$ and 72$a$ are similarly constructed. A slit 84 separates flaps 75$a$ and 74$a$ and, similarly, flaps 73$a$ and 72$a$. With the provisions just described, the upper flaps 71$a$–76$a$ may be folded reversely down into abutting relationship with their associated side walls and outside the side walls to form a self-held outer collar when the carton is folded into tubular form.

Side panel 74 and its associated upper flap 74$a$ are provided with an elliptical or elongated cut-out 86 which extends on either side of the upper edge 81, and serves to provide a notch in the upper periphery of the carton collar when assembled. Panel 74 and its lower flap 74$b$ are provided with an arcuate score line or weakening line 88 which terminates in the lower free edge 74$c$ of the lower flap to permit the portion 89, enclosed thereby, to be removed as desired, as described hereinafter. Lower flap 71$b$ is provided with parallel weakening lines 91 normal to the lowermost free edge of the flap. The above-described principal component is desirably formed of solid fiberboard which has been treated with a resin or wax-like material to resist moisture.

In FIG. 8, there is shown in knock-down form a pad member 94 used in forming one thickness of the bottom of the receptacle of this embodiment. The pad is of essentially hexagonal configuration, having sides which conform to the width of the panels 71 to 76 in the principal shell member. The pad member 94 is provided with parallel score lines or weakening lines 95 and 96, which enclose a narrow strip extending from one side of the hexagonal pad to just short of the opposite side of the hexagonal pad. The lines then flare outwardly in diverging fashion as at 97, 98.

Another element 100 of the bottom construction is shown in FIG. 9 in knock-down form. This bottom former 100 is likewise a single, hexagonal-shaped pad, preferably formed of corrugated board, consisting of a lower sheet 101, an upper sheet 103, and including therebetween fluted corrugating medium 102. The size of the hexagonal pad 100 is the same as pad 94. One side of the hexagonal pad 100 contains an arcuate score line or weakening line 104 which defines a hemisphere 105 having its diameter in an edge. The same edge is provided with a small rectangular notch 104a. The side or edge opposite is provided with a smaller hemispherical notch 106 containing, in addition, at its innermost edge, a rectangular notch 107.

The closure for the receptacle 70 is shown in knockdown blank form in FIG. 10. The closure, generally identified by reference numeral 110, is composed of a central panel 111 of hexagonal configuration, conforming in size to the section of the member 70. Each side of the hexagonal panel is provided with foldably attached flaps 112, each of which have end extremities 113 which will overlap an adjoining flap when the flaps are folded normal to the panel 111. Two opposed flaps, identified as 114 and 115, are provided respectively with additional ears 116 and 117, which are adapted to fold upwardly for ready engagement with the collar flange flaps formed on the principal member 70. The panel 111 is provided with score lines or weakening lines 118 and 119, which define concentric, elongated, oval patterns. When cut on the line of weakening 119, element 120 separates and is shown in enlarged view in FIG. 11. The element 120 may then be modified by removing the area enclosed by the score line 118, which leaves an elongated central opening 121. The element 120 is further provided with score line 122, which traverses the width of the element and permits the element 120 to be folded into double thickness, resulting in the construction shown in FIG. 12. As shown, it is essentially a U-shaped member of double thickness, which may be used in a manner to be hereinafter described.

Figure 13:
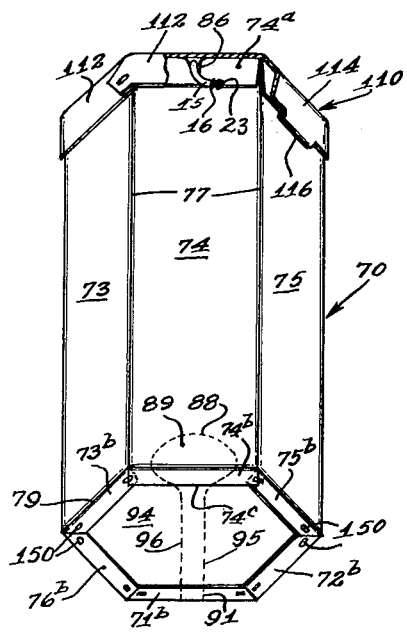
FIG. 13 is a perspective view looking upward at the assembled receptacle formed from the elements shown in FIGS. 7–12.
Figure 14:
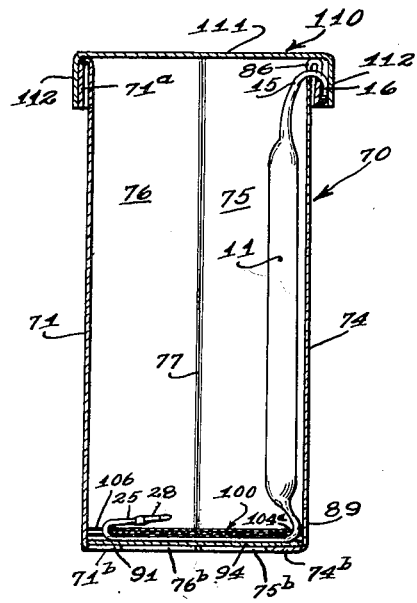
FIG. 14 is a sectional view of the receptacle shown in FIG. 13.
Figure 16:
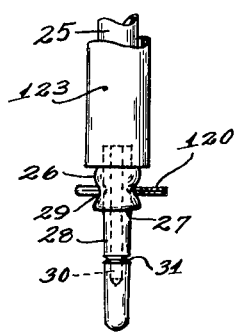
FIG. 16 is an enlarged view of the dispensing end of the rubber bag, as assembled in the dispensing component of the refrigeration cabinet.

The carton is shown in assembled form in FIGS. 13 and 14. In the construction, the principal member 70 is folded upon the fold line 81 until the upper flaps 71a–76a are in flush relationship with the outer surfaces of their associated side wall panels. The collar is held by means of the design of the top flaps as described hereinabove. Then, the members are folded on score lines 77 to form a tubular construction with the glue flap 78 connecting with panel 76. Next, the pad member 94 is inserted and located in normal relationship to the side walls in proximity to the lower edge 79 to thus form an outer bottom thickness of the receptacle, whereupon the bottommost flaps 71b–76b can be folded over into flush relationship with the pad 94, and stapled thereto conveniently by application of the staples 150. The bottom pad 94 is located so that the arcuate portions 97, 98 of the weakening lines 95, 96 are in the same side as the arcuate zone 89 formed in the side panel 74 and its depending flap 74b. Next, the bottom pad member 100 and the bag 11 are connected together. First, the dispensing extension 25 of the bag is stretched across the bottom of the pad 100, with its dispensing end 29 sticking up about and engaged by the cut-outs 106 and 107, while the portion adjacent the bag proper is enclosed by notch 104a (FIGS. 14 and 17). The bag proper 11 can then be held in one hand, while the pad 100 and bag assembly are pushed down into the container with the pad 100 proximate to the lower pad 94, but having the bag extension 25 therebetween. The pad 100 is, of course, located so that the score area 104 will overlie the scored portion 97, 98 in the pad 94. Then, the filling end 16 of the bag 11 may be looped over the notch or cut-out 86 in the collar portion in the upper end of the container 70. The rigid plastic fitments serve to engage the cut-outs 86 at the top, and 106, 107 in the bottom pad former. The size of the pad member 100 is such that it frictionally engages the sides of the receptacle and thus holds the lowermost bag extension 25 in the bottom, as shown in FIGS. 14 and 17. The closure 110 may then be conveniently applied by simply engaging the opposed ear portions 116, 117 with any pair of opposed collar-forming flaps 71a–76a. The cover can be disengaged simply by inserting the finger between the ear portion 116 and the flap 114, pushing the side wall in slightly to provide clearance, and flipping downwardly.

The receptacle components, namely, the principal container 70, the bottom former pads 94 and 100, and the cover member 110, may be shipped in their knock-down, flat form, and then assembled by the manufacturer or producer of the ingredient, in this case, milk. If desired, the container 70 may be partially assembled by folding on the score line between the panels 73 and 74, and attaching the glue flap 78 to the panel 76 by means of staples, adhesive, or the like. Then, the bottom former pads 94 and 100, the cover 110, and the rubber bag 11 may be placed in the envelope formed of the member 70 and shipped to the dairy. The dairy need then only finish the assembly in the manner described above. When assembled in the manner illustrated in FIG. 14, the filling with, for instance, milk, may be conveniently accomplished without otherwise being concerned with the positioning of the inflatable bag. After the bag has been filled under pressure, usually by a volumetric pump, the upper neck portion 15 of the bag need only be pinched while the filling nozzle is removed and the cap 23 is applied. As thus provided, the filling portion of the inflatable bag is located in the upper portion of the container 70.

The packages described provide adequate protection for the bag inflated with the liquid contents. The bag is prevented from shifting about within the confines of the container by the frictional contact between its bulged-out sides and the inner surface of the side walls of the container element 70. The container has been found to be adequately protected for purposes of shipping, even when stacked several tiers high. The hexagonal tubular shell admirably resists compressive loading from above. The cover, with the interlocking feature of the ear flap with the downturned collar portion of the principal body member 70, provides a convenient hand-hold for a person to manually carry one or even two of the containers. Generally, the containers are designed to hold five gallons of liquid, in the case of milk. Larger or lesser quantities may, of course, be used.

Figure 15:
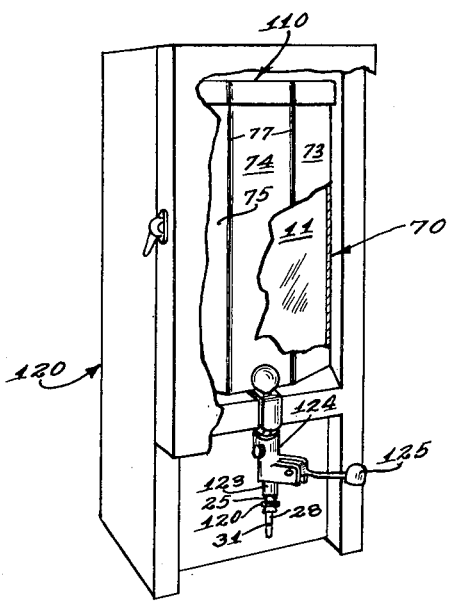
FIG. 15 is a perspective view, partially broken away, illustrating the manner of utilization of the receptacle of the invention.

The consumer, who, in the case of milk, is the retail outlet such as a restaurant, a drive-in, a drugstore, or the like, may conveniently convert the shipping package to a dispensing package. Usually, the package will be intended for location in a refrigerated cabinet 120 of the type shown in FIG. 15. To prepare the package for dispensing purposes, the score area 89 in the panel 74 and flap 74b will first be removed by grasping the free edge 74c (FIGS. 7 and 13), and tearing outwardly, then upward. This will expose the elongated strip in the pad 94, enclosed by the score lines 95, 96, 97, and 98 (FIG. 18). This is removed by grasping the edge adjacent the score 97, 98, and firmly tearing across the bottom. At the same time, the rectangular area in the bottom flap 71b, enclosed by the score line-weakened area 91, will come off. At this stage, the dispensing end 25 of the bag 11 will be exposed as shown in FIG. 19. Next, the hemispherical area 105 in the corrugated bottom former 100 is removed by tearing on the score line 104. The length of the lowermost dispensing extension 25 of the bag 11 will thus be given some slack by the decrease in the lateral span, whereupon the end 28 thereof may be moved outwardly and then away from the notch 107 into the larger area 105, and pulled downwardly outside of the confines of the container, as shown in FIG. 20.

The entire assembly may now be placed in the refrigerating cabinet 120 (FIG. 5), and the dispensing end 28 of the bag threaded through the rigid metal sleeve member 123, which includes a pinching valve arrangement 124, controlled by the hand-operable lever 125. When the end portion of the bag extremity protrudes from the other end of the sleeve 123, the U-shaped member 120

(FIG. 12) may be slipped about the groove 31 in the fitment 28, whereupon the fitment may be snapped on the outermost groove 31 to expose the internal bore 30, and thus permit the contents to flow from the bag as governed by operation of the control lever 125. As the milk is gradually emptied from the container, the elastic nature of the inflatable bag tends to cause the dispensing extension 25 to contract. However, the member 120, being larger than the sleeve 123, prevents the end from being withdrawn up within the sleeve 123.

When the liquid contents have been completely drained, which characteristic is enhanced by the provision of the engagement of the upper filling end of the bag with the collar portion of the receptacle, and the fact that the liquid is under pressure, the member 120 may be simply removed, the dispensing extension 25 drawn back up through the sleeve 123, and the entire assembly, including the receptacle and the inflatable bag, may be disposed of.

It will be appreciated that the package as described above provides a completely sanitary manner of packaging, shipping, and dispensing the liquid concerned. The dispensing end of the inflatable bag is completely sealed once the fitment 28 is located in the end thereof. The filling end is likewise sealed once the plastic fitment is inserted in the filling opening in the bag. To fill the bag, the cap 23 need only be removed momentarily for insertion of the nozzle of the outlet portion of the filling pump, which may be easily maintained in a sanitary condition. Once the filling is completed and the cap replaced, the contents are maintained in this protected condition through the shipping and handling thereof, even to the installation of the package into the refrigerating unit.

Various modifications may be resorted to within the spirit and scope of the appended claims.

We claim:

1. A shipping and dispensing package for fluent material, said package including an inflatable bag-like member formed of elastic material, and having bellow-like folds formed in side walls to aid the extensible character of the bag, said bag-like member being provided with elongated, tubular ends at opposite ends of said member, each of said tubes having an aperture formed in the ends for filling and draining of said bag-like member, means for selectively closing said apertures, and a supporting and protective container formed of expendable material for receiving said bag-like member in snug, telescoping relationship when said bag-like member is inflated and filled with fluent material, said container having filling and dispensing access means proximate to its corresponding counterpart on said bag-like member, and means for securing one of said tubular ends to the upper end of said container adjacent its associated access means, said bag-like member being proportioned to remain substantially erect when empty so as to prevent the side walls of said bag from coming into sealing engagement with the aperture of said lowermost tube as fluent material is drained from said bag.

2. A receptacle for fluent material which comprises (1) an outer shell formed of relatively stiff, sheet-like material, said shell including (a) foldably connected, upstanding side walls in the form of an open-ended tube, having an upper end and a lower end, (b) a collar encircling said upper end formed of downwardly folded flaps connected to the upper ends of said side walls, each flap being connected to one adjacent flap to thereby hold said collar in place, one of said flaps and its associated side wall being provided with a connected cut-out, thus forming a notch in the upper end of said tube, (c) flaps connected to the lower ends of said side walls folded inwardly to form a ledge, (d) a pad spanning said lower open end and secured to said ledge, and (e) a second pad overlying said first pad and having at least two opposed edges spaced to firmly abut two opposed walls for frictionally positioning said second pad, said second pad further including notches in said opposed edges, and (2) an inflatable bag formed of elastic, rubber-like material within said outer shell, said bag including (a) a filling end receivable by said notch in said upper end of said tube, (b) a dispensing extension positioned between said pads with its extremities held by said notches in said second pad, said shell further including means for access to said dispensing extension and movement thereof to a position outside said shell.

3. A receptacle for fluent material which comprises: (1) an outer shell formed of relatively stiff, sheet-like material, said shell including (a) foldably connected, upstanding side walls in the form of an open-ended tube, having an upper end and a lower end, (b) a collar encircling said upper end formed of downwardly folded flaps connected to the upper ends of said side walls, each flap being connected to one adjacent flap to thereby hold said collar in place, one of said flaps and its associated side wall being provided with a connected cut-out, thus forming a notch in the upper end of said tube, (c) flaps connected to the lower ends of said side walls folded inwardly to form a ledge, (d) a pad spanning said lower open end and secured to said edge, and (e) a second pad overlying said first pad and having at least two opposed edges spaced to firmly abut two opposed walls for frictionally positioning said second pad, said second pad further including notches in said opposed edges; and (2) an inflatable bag formed of elastic, rubber-like material within said outer shell, said bag including (a) a filling end receivable by said notch in said upper end of said tube, said filling end including a tubular extension of said bag, a solid cylindrical fitment larger than said notch secured to said extension and a closure for said fitment, (b) a dispensing extension integral with said bag positioned between said pads with its extremities received by notches in said second pad, said extension including a fitment larger than said notch in said pad, positioned in the endmost extremity, said fitment having one end sealed over, said shell further including means for access to said dispensing extension for movement of said dispensing extension to a position outside said shell.

4. A receptacle for fluent material which comprises: (1) an outer shell formed of relatively stiff, sheet-like material, said shell including (a) foldably connected, upstanding side walls in the form of an open-ended tube, having an upper end and a lower end, (b) a collar encircling said upper end formed of downwardly folded flaps connected to the upper ends of said side walls, each flap being connected to one adjacent flap to thereby hold said collar in place, one of said flaps and its associated side wall being provided with a connected cut-out, thus forming a notch in the upper end of said tube, (c) flaps connected to the lower ends of said side walls folded inwardly to form a ledge, (d) a pad spanning said lower open end and secured to said ledge, and (e) a second pad overlying said first pad and being of shape and size to firmly abut the side walls of said shell for frictionally positioning said second pad, said second pad further including notches in two opposed edges, one of said just mentioned edges abutting the said wall having the cut-out; and (2) an inflatable bag formed of elastic, rubber-like material within said outer shell, said bag including (a) a filling end receivable by said notch in said upper end of said tube, and (b) a dispensing extension positioned between said pads with its extremities held by said notches in said second pad, said shell further including a removable portion proximate said dispensing extension to thereby expose said dispensing extension.

5. A receptacle as claimed in claim 2, which further includes a telescoping cover element comprising an upper end-spanning panel, depending flaps abutting said collar forming flaps, and having lateral edges secured together, and at least two tab extensions on two opposed flaps for projecting up between the said collar and said side wall to lock said cover on said shell.

6. A receptacle as claimed in claim 3, which further includes a telescoping cover element comprising an upper end-spanning panel, depending flaps abutting said collar forming flaps, and having lateral edges secured together, and at least two tab extensions on two opposed flaps for projecting up between the said collar and said side wall to lock said cover on said shell.

7. A receptacle as claimed in claim 6, wherein the fitment in said dispensing extension includes a groove for seating said dispensing extension and the cover element includes a separable, generally rigid, U-shaped member, the legs of which enclose said grooved fitment to secure said dispensing extension.

8. A receptacle for liquids desirably maintained in a refrigerated cabinet, which includes a tube-like dispensing nozzle incorporating a hand-operated pinch valve, said receptacle comprising a paperboard carton, an inflatable, elastic, bag-like member receivable within said carton, said member having an upper tube-like extension serving as a filling end and a lower tube-like extension serving as a dispensing end and being receivable in said dispensing nozzle, said carton being provided with removable access means proximate said upper and lower extensions, means for securing said upper extension to said carton near its associated access means, and means for securing said lower extension to said dispensing nozzle in dispensing relationship, said bag-like member being proportioned to remain substantially erect when empty so as to prevent the side walls of said bag-like member from coming into sealing engagement with said lower tube-like extension as liquids are drained from said bag-like member.

9. A shipping and dispensing package for fluent materials comprising, an outer container and an inflatable, elastic, bag-like member freely receivable within said container, said member having a lower tube-like extension serving as a contents dispensing means, said carton being provided with access means proximate the lower portions thereof, means for securing the upper portions of said bag-like member to said container near its upper end, and means for securing the lowermost portions of said bag-like member relative to said container to tension said bag-like member when empty, said bag-like member being proportioned to remain substantially erect when empty so as to prevent the side walls of said bag-like member from coming into sealing engagement with said lower tube-like extension as fluent materials are drained from said bag-like member.

10. A shipping and dispensing package for fluent materials for use in a refrigerated cabinet having tube holding means comprising, an outer container and an inflatable, elastic bag-like member freely receivable within said container, said member having a lower tube-like extension serving as a contents dispensing means, said carton being provided with access means proximate the lower portions thereof, means for securing the upper portions of said bag-like member to said container near its upper end, and said lower dispensing extension being adapted to be secured to said tube holding means to tension said bag-like member when empty, said bag-like member being proportioned to remain substantially erect when empty so as to prevent the side walls of said bag-like member from coming into sealing engagement with said lower tube-like extension as fluent materials are drained from said bag-like member.

11. A shipping and dispensing package for fluent materials for use in a refrigerated cabinet having tube holding means comprising, an outer carton and an inflatable, elastic, bag-like member freely receivable within said carton, said member having an upper tube-like extension serving as a filling end and a lower tube-like extension serving as a dispensing end, said carton being provided with access means proximate said upper and lower extensions, means for securing said upper extension to said carton near its associated access means, and said lower dispensing extension being adapted to be secured to said tube holding means to tension said bag-like member between said upper and lower extensions, said bag-like member being proportioned to remain substantially erect when empty so as to prevent the side walls of said bag-like member from coming into sealing engagement with said lower tube-like extension as fluent materials are drained from said bag-like member.

References Cited in the file of this patent

UNITED STATES PATENTS

| | | |
|---|---|---|
| 2,159,835 | Waters | May 23, 1939 |
| 2,493,337 | Buttery | Jan. 3, 1950 |
| 2,721,764 | Lazard | Oct. 25, 1955 |
| 2,758,474 | Stevens | Aug. 14, 1956 |
| 2,768,638 | Henke | Oct. 30, 1956 |
| 2,831,610 | Dennie | Apr. 22, 1958 |
| 2,861,718 | Winzen | Nov. 25, 1958 |
| 2,905,560 | Bender et al. | Sept. 22, 1959 |
| 2,950,039 | Wilson | Aug. 23, 1960 |
| 2,954,901 | Winstead | Oct. 4, 1960 |
| 2,991,916 | Kish | July 11, 1961 |